US012064965B2

(12) United States Patent
Miura et al.

(10) Patent No.: US 12,064,965 B2
(45) Date of Patent: Aug. 20, 2024

(54) ELEMENT SUBSTRATE AND PRINT HEAD

(71) Applicant: CANON KABUSHIKI KAISHA, Tokyo (JP)

(72) Inventors: Yosuke Miura, Tokyo (JP); Yasuo Fujii, Kanagawa (JP); Yasuhiro Soeda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 168 days.

(21) Appl. No.: 17/901,033

(22) Filed: Sep. 1, 2022

(65) Prior Publication Data

US 2023/0074434 A1 Mar. 9, 2023

(30) Foreign Application Priority Data

Sep. 3, 2021 (JP) ................................ 2021-143903

(51) Int. Cl.
*B41J 2/14* (2006.01)

(52) U.S. Cl.
CPC ................................ *B41J 2/14072* (2013.01)

(58) Field of Classification Search
CPC .................................................. B41J 2/14072
See application file for complete search history.

(56) References Cited

U.S. PATENT DOCUMENTS 10,040,284 B2 8/2018 Fujii
2015/0343773 A1* 12/2015 Akama ................. B41J 2/1753 347/50
2019/0001680 A1* 1/2019 Miura ................. H05K 1/0212

FOREIGN PATENT DOCUMENTS

JP 2004261985 A * 9/2004 .......... B41J 2/04533
JP 2016-137705 A 8/2016

* cited by examiner

*Primary Examiner* — Sharon Polk
(74) *Attorney, Agent, or Firm* — VENABLE LLP

(57) ABSTRACT

According to the present invention, it is possible to provide an element substrate and a print head with which a decrease in yield and an increase in cost in a manufacturing process can be suppressed. For that purpose, a VH wiring line and a GNDH wiring line are provided in parallel in the same layer.

11 Claims, 9 Drawing Sheets

ELEMENT SUBSTRATE AND PRINT HEAD

BACKGROUND OF THE INVENTION

Field of the Invention

The present invention relates to an element substrate for a print head ejecting a liquid to perform printing and a print head.

Description of the Related Art

As a print speed and image quality increase in recent years, the number of heating elements mounted on a print head tends to increase. Thus, as the area of an element substrate on which a circuit for driving those heating elements is mounted increases, it has become important to optimize an arrangement of the heating elements or a wiring layout in a case where the shape of the element substrate is a parallelogram, a trapezoid, or the like in order to mount a plurality of element substrates on the print head.

Japanese Patent Laid-Open No. 2016-137705 discloses a liquid ejection head using an element substrate in which a positive side wiring (VH wiring) layer for passing a current through a heating element and a negative side wiring (GNDH wiring) layer are provided, the VH wiring layer and the GNDH wiring layer facing each other.

However, in the configuration of Japanese Patent Laid-Open No. 2016-137705, since different power supply wiring lines (a VH wiring line and a GNDH wiring line) face each other in a large area, there is a possibility that the frequency of interlayer short circuits caused by foreign matter increases at the time of generating a wiring line and there is concern that yield decreases. Further, there is also concern that each of the VH wiring line and the GNDH wiring line uses one layer, which costs.

SUMMARY OF THE INVENTION

Thus, the present invention provides an element substrate and a print head with which a decrease in yield and an increase in cost in a manufacturing process can be reduced.

Accordingly, the element substrate of the present invention includes a plurality of arranged heating elements and an electrical wiring line configured to supply the heating elements with power, the electrical wiring line being provided in a first electrical wiring layer and a second electrical wiring layer overlapping the first electrical wiring layer, wherein the first electrical wiring layer includes a first wiring line connected to one connecting unit of the heating elements and a second wiring line connected to the other connecting unit of the heating elements, wherein the second electrical wiring layer includes a third wiring line connected to the first wiring line and a fourth wiring line connected to the second wiring line, the first electrical wiring layer including a first wiring group in which at least one pair of the first wiring line and the second wiring line are provided in parallel, the second electrical wiring layer including a second wiring group in which at least one pair of the third wiring line and the fourth wiring line are provided in parallel, wherein a wiring line of the first wiring group and a wiring line of the second wiring group intersect when viewed from a viewpoint of a line orthogonal to the first electrical wiring layer, and wherein the first wiring group and the second wiring group are different in wiring thickness.

According to the present invention, it is possible to provide an element substrate and a print head with which a decrease in yield and an increase in cost in a manufacturing process can be suppressed.

Further features of the present invention will become apparent from the following description of exemplary embodiments with reference to the attached drawings.

DESCRIPTION OF THE EMBODIMENTS

First Embodiment

A description will be given below of a first embodiment to which the present invention can be applied with reference to the drawings. A subject below is an inkjet print head causing ejection of ink for printing, but the present embodiment can be applied to a print head that ejects any liquid.

Figure 1A:
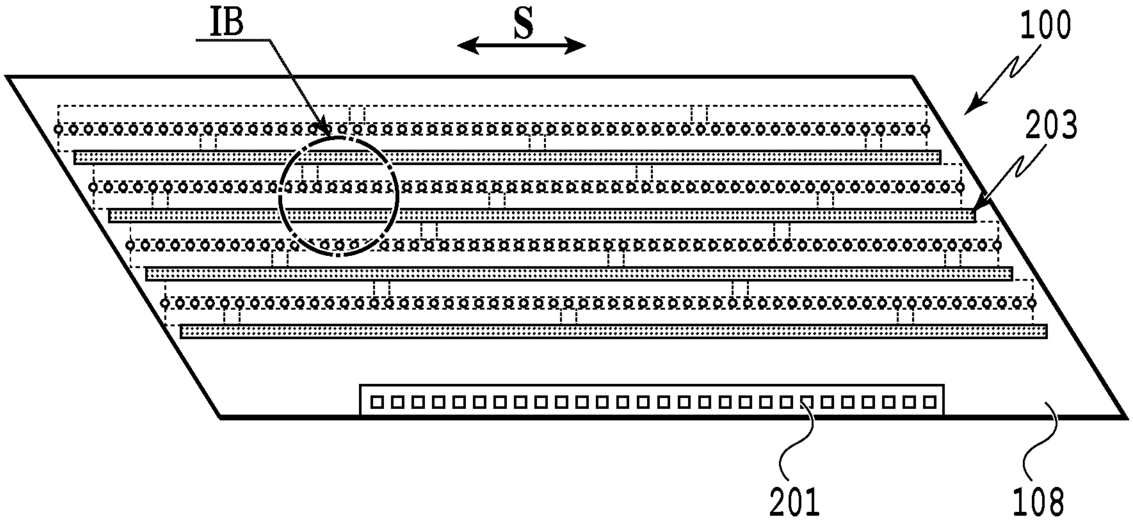
FIG. 1A is a plan view showing an element substrate.
Figure 1B:
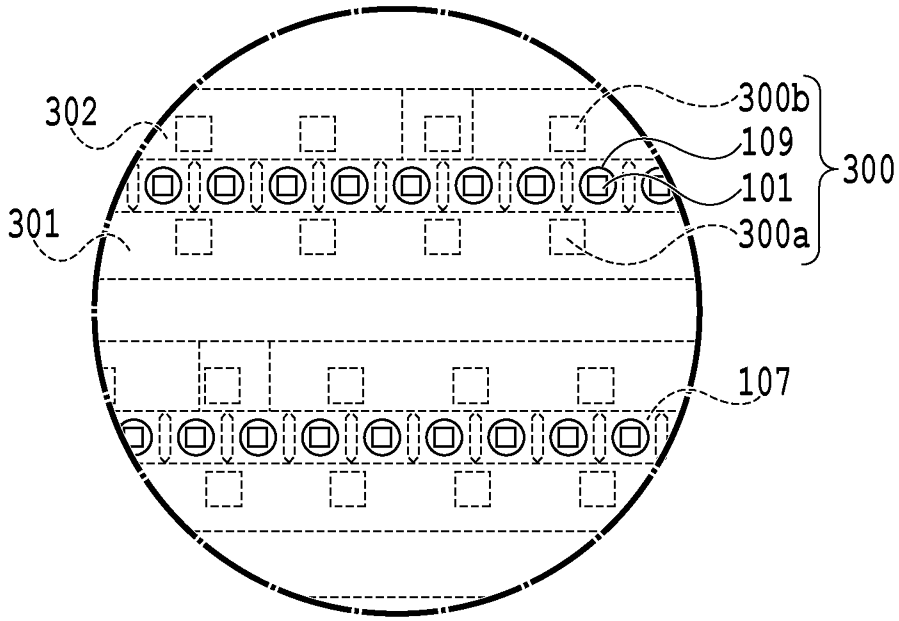
FIG. 1B is an enlarged view showing a portion IB in FIG. 1A.

FIG. 1A is a plan view showing an element substrate 100 in the present embodiment and FIG. 1B is an enlarged view showing a portion IB in FIG. 1A. The element substrate 100 has a plane shape of a parallelogram and includes a plurality of heating elements 101 in a plurality of rows, a drive circuit 203 configured to drive each of the heating elements 101, and an electrode pad 201 configured to transfer a driving current to the heating element 101. Further, the element substrate 100 includes an ejection port forming member 108 formed by aligning a plurality of ejection ports 109 provided in correspondence with the heating elements 101 in rows along an arrow S direction. In the print head, a plurality of the element substrates 100 are arranged in the arrow S direction. The drive circuit 203 is connected to an electrode pad 201 and generates a driving current for the heating element 101 according to a print signal supplied from the outside of the print head via the electrode pad 201.

In the element substrate 100, a liquid supply path 301 and a liquid collection path 302 extend in the arrow S direction and the liquid supply path 301 and the liquid collection path 302 is provided with a plurality of openings 300 (a supply port 300*a*, a collection port 300*b*), respectively. The liquid supply path 301 is provided with a plurality of the supply ports 300*a* capable of supplying the heating elements 101 with a liquid, and the liquid collection path 302 is provided with a plurality of the collection ports 300*b* capable of collecting the liquid from the heating elements 101. The liquid supplied to a pressure chamber 107 from the supply port 300*a* of the liquid supply path 301 is heated by the heating element 101 and foamed, so that the liquid is ejected from each of the ejection ports 109. The liquid supplied from the supply port 300*a* and not ejected is collected at the collection port 300*b* in the liquid collection path 302. The ink collected at the collection port 300*b* is supplied to the liquid ejection head again via a tank unit (not shown) or the like provided in a printing apparatus. In this way, the liquid circulates in the printing apparatus. The supply port 300*a* and the collection port 300*b* are through holes that penetrate a substrate 114 in the element substrate 100 (see FIG. 2B to be described later). As described above, by sandwiching the heating element 101 between the supply port 300*a* and the collection port 300*b*, refilling after ejection can be performed at a relatively high speed.

Figure 2A:
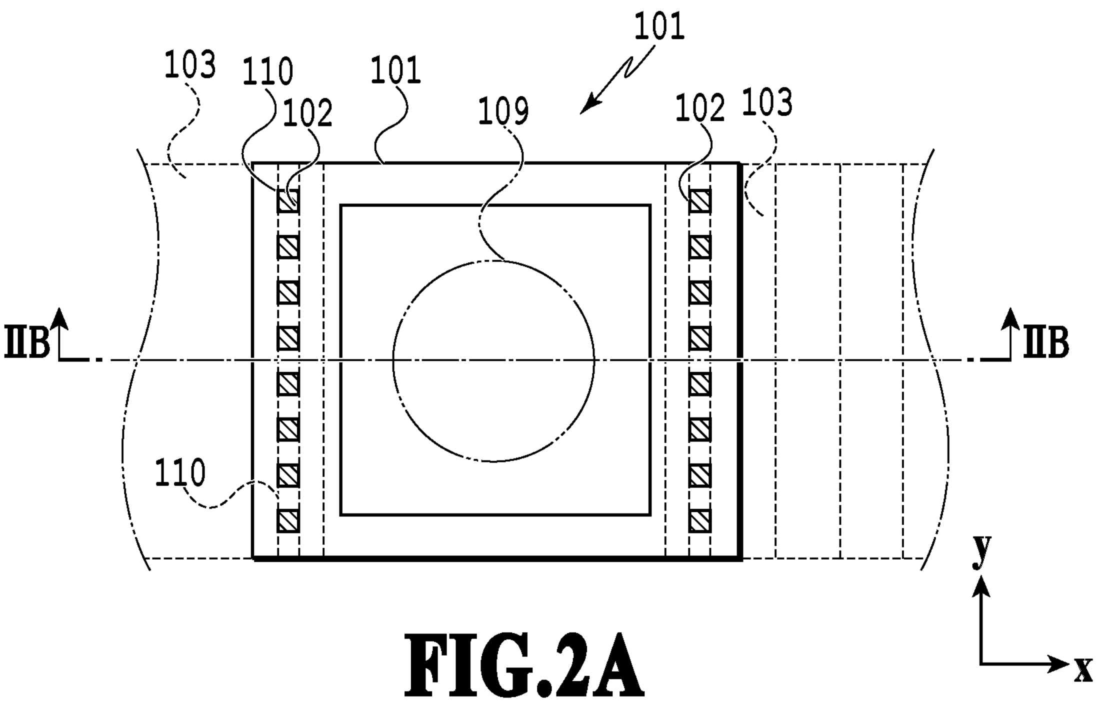
FIG. 2A is a plan view of a heating element.
Figure 2B:
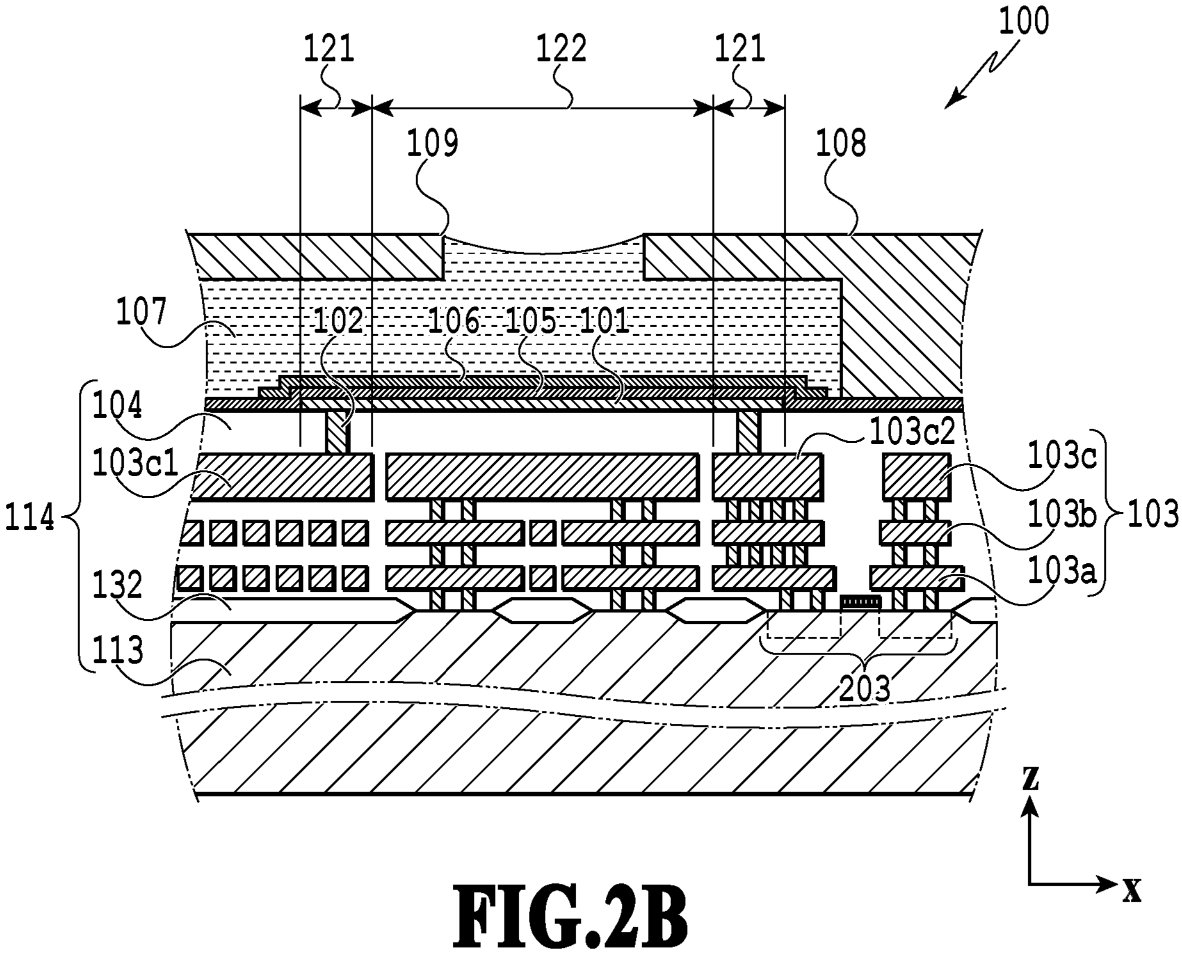
FIG. 2B is a cross-sectional view taken along a line IIB-IIB in FIG. 2A.

FIG. 2A is an enlarged plan view of a peripheral area of one heating element 101 in the element substrate of the print head of the present embodiment and FIG. 2B is a cross-sectional view taken along a line IIB-IIB in FIG. 2A. The heating element 101 is provided so as to face the ejection port 109 and is provided with a plurality of connecting members 102 connecting an electrical wiring line 103 and the heating element 101.

Hereinafter, the direction of a current flowing through the heating element 101 is defined as an X direction and a direction orthogonal to the X direction is defined as a Y direction. Additionally, a direction orthogonal to the X direction and the Y direction is defined as a Z direction. The Y direction is a direction in which the heating elements 101 or the ejection ports 109 are arranged. The Z direction is a direction orthogonal to a surface on which the ejection port is formed and is a direction in which the liquid is ejected.

The element substrate 100 includes the substrate 114 and the ejection port forming member 108. The substrate 114 includes a base material 113 formed of Si and an insulating film 104 formed on the base material 113. On the substrate 114, the heating element 101 that generates heat energy for ejecting a liquid, a protective film 105, and a cavitation resistant film 106 are provided. The heating element 101 is formed of a Ta compound such as TaSiN. The insulating film 104 is formed of an insulator such as SiO. The ejection port forming member 108 is provided on the surface of the substrate 114 on which the heating element 101 is formed. The ejection port forming member 108 includes the ejection ports 109 corresponding to respective heating elements 101 and forms the pressure chamber 107 for each ejection port 109 together with the substrate 114.

In the insulating film 104 provided on the substrate 114, the electrical wiring line 103 for supplying the heating element 101 with a current is provided so as to be embedded in the insulating film 104. The electrical wiring line 103 electrically connects the drive circuit 203 and the heating element 101 via each of the connecting members 102. The electrical wiring line 103 is made of aluminum and has a film thickness (a dimension in the Z direction) of about 0.4 to 1.2 μm. The heating element 101 generates heat due to the supplied current, and the heating element 101 having a high temperature heats the liquid in the pressure chamber 107 to generate bubbles. The bubbles cause the liquid in the vicinity of the ejection port 109 to be ejected from the ejection port 109 and printing is performed. The heating element 101 is covered with the protective film 105 made of SiN. The protective film 105 may be formed of SiO or SiC. The protective film 105 is covered with the cavitation resistant film 106. The cavitation resistant film 106 is made of Ta or Ir. The electrical wiring line 103 is a metal and may be any one of Al, Cu, Ag, Au, Pt, W, Ni, and Co or an alloy including any one of Al, Cu, Ag, Au, Pt, W, Ni, and Co.

The connecting members 102 are positioned at intervals along the Y direction. Each of the connecting members 102 is covered with the heating element 101 when viewed from a direction orthogonal to the surface on which the heating element 101 is provided. The connecting member 102 connects the electrical wiring line 103 and the heating element 101 in the vicinity of both end portions in the X direction of the heating element 101. Accordingly, the current flows in the X direction in the heating element 101. The heating element 101 includes, at one end side and the other end side, connection areas 110 to which a plurality of connecting members 102 are connected. The connecting member 102 is a plug extending in the Z direction from the vicinity of an end portion of the electrical wiring line 103. The connecting member 102 has a substantially square cross section in the present embodiment, but corners may be rounded, and the shape of the cross section is not limited to a square but may be another shape such as a rectangle, a circle, or an ellipse.

The connecting member 102 is made of tungsten but can be formed of any one of titanium, platinum, cobalt, nickel, molybdenum, tantalum, and silicon, or a compound thereof. The connecting member 102 may be integrally formed with the electrical wiring line 103. That is, the connection member 102 integrated with the electrical wiring line 103 may be formed by cutting out a portion of the electrical wiring line 103 in a thickness direction.

The electrical wiring line 103 is provided in the insulating film 104 and is connected to the heating element 101 via the connecting member 102. Since electrical connection is made to the heating element 101 from a back surface side in this way, there is no need for an electrical wiring line covering the front surface side of the heating element 101. In a configuration in which the electrical wiring line 103 is connected to the front surface side of the heating element 101, an electrical wiring line having a film thickness of about 0.6 to 1.2 μm is laminated on the heating element 101. Thus, there is a need to provide a protective film having a relatively large film thickness in order to secure a coverage property for a step height of about 0.6 to 1.2 μm.

In contrast, in the present embodiment, there is no need for the electrical wiring line provided on the front surface side of the heating element 101. Since the film thickness of the heating element 101 is about 0.01 to 0.05 μm, the step height is significantly smaller than that in the above configuration. Thus, a sufficient coverage property can be secured with the protective film 105 having a film thickness of about 0.15 to 0.3 μm, so that the protective film 105 can be thinned and the efficiency of heat transfer to ink is remarkably improved. This can achieve both reduction in power consumption and high quality by stabilizing foaming. It can also be expected that the patterning accuracy and reliability of the cavitation resistant film 106, the adhesion of the ejection port forming member 108 to the substrate 114, and processing accuracy will be improved, and thus, not only high quality but also a manufacturing advantage can be obtained.

In order to obtain a more uniform ejection characteristic, accuracy is necessary for variations in foaming and resistance values, so that a base (lower area) of the heating element 101 is preferably flat. Conventionally, it has been difficult to arrange a wiring pattern or the like immediately under or around a heating element so as not to generate a step height. In the configuration of the present embodiment, the electrical wiring line 103 of each layer and the base portion of the heating element 101 are flattened by processing such as CMP. As a result, as shown in FIG. 2B, a contact surface of the connecting member 102 which is in contact with the heating element 101 and a contact surface of the insulating film 104 which is in contact with the heating element 101 are provided on the same plane.

As described above, flattening the base (lower area) of a heat generating resistor layer allows the electrical wiring line 103 of a pattern such as a signal wiring line and a power supply wiring line to pass immediately under the heating element 101, that is, through the insulating film 104 between a central area 122 to be described later and the base material 113 or around the heating element 101. Further, since a transistor can be arranged in the area, the area of the element substrate 100 can be reduced, the cost of the print head can be reduced, and the density of the ejection port 109 can be increased. In the present embodiment, as shown in FIG. 2B, the drive circuit 203 and a field oxide film 132 are formed in an interface area between the base material 113 formed of Si and the insulating film 104.

Such a configuration enables to multi-layer the electrical wiring line 103 while suppressing an influence on the characteristics of the heating element 101. Further, allocating a plurality of wiring layers to the electrical wiring line 103 enables to significantly reduce power supply wiring resistance.

In the present embodiment, the electrical wiring line 103 has three layers at different distances from the heating element 101 in a direction orthogonal to the plane of the element substrate 100. The electrical wiring layer includes an electrical wiring layer 103*a* farthest from the heating element 101, an electrical wiring layer 103*b* second farthest from the heating element 101, and an electrical wiring layer 103*c* closest to the heating element 101. The electrical wiring layer 103*a* is allocated to a signal wiring layer or a logic power supply wiring layer for driving the heating element 101. Further, the electrical wiring layer 103*b* is allocated to the signal wiring layer or the logic power supply wiring layer for driving the heating element 101 and a wiring layer for supplying the heating element 101 with a current. Further, the electrical wiring layer 103*c* is allocated to a wiring layer for supplying the heating element 101 with a current.

Here, in a conventional element substrate, a VH wiring layer provided with a positive side (one side) wiring line for passing a current through a heating element and a GNDH wiring layer provided with a negative side (the other side) wiring line are provided so as to face each other. However, in such a configuration, since the VH wiring line and the GNDH wiring line face each other in a large area, there is a possibility that the frequency of interlayer short circuits caused by foreign matter will increase, and there is concern that yield decreases. Further, each of the VH wiring line and the GNDH wiring line uses one layer, which costs. Thus, in the present embodiment, the VH wiring line and the GNDH wiring line are provided in the same layer. It is only required that at least a pair of the VH wiring line and GNDH wiring line be provided in parallel in the same layer. A detailed description will be given of the electrical wiring layer in the present embodiment.

Figure 3A:
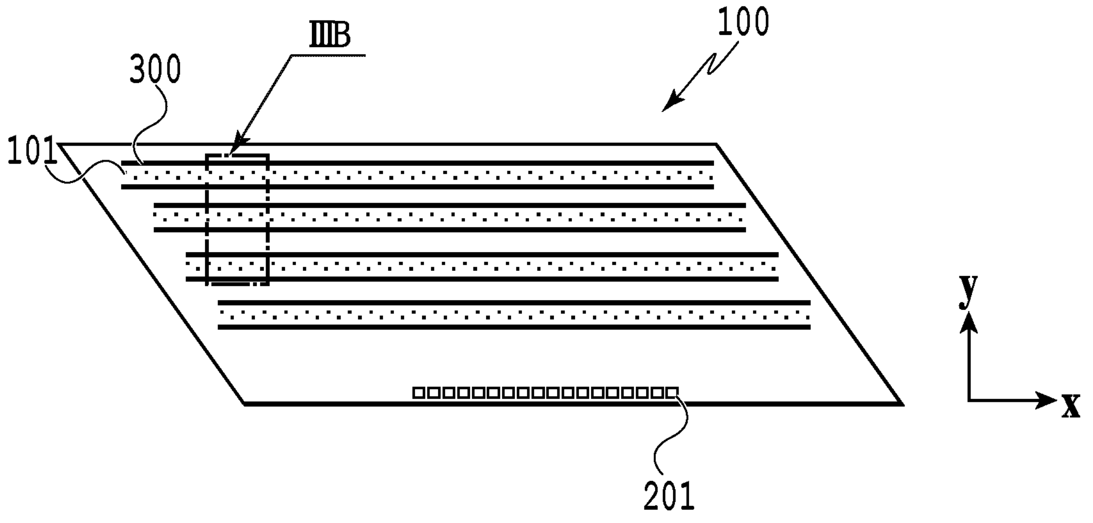
FIG. 3A is a plan view of the element substrate.
Figure 3B:
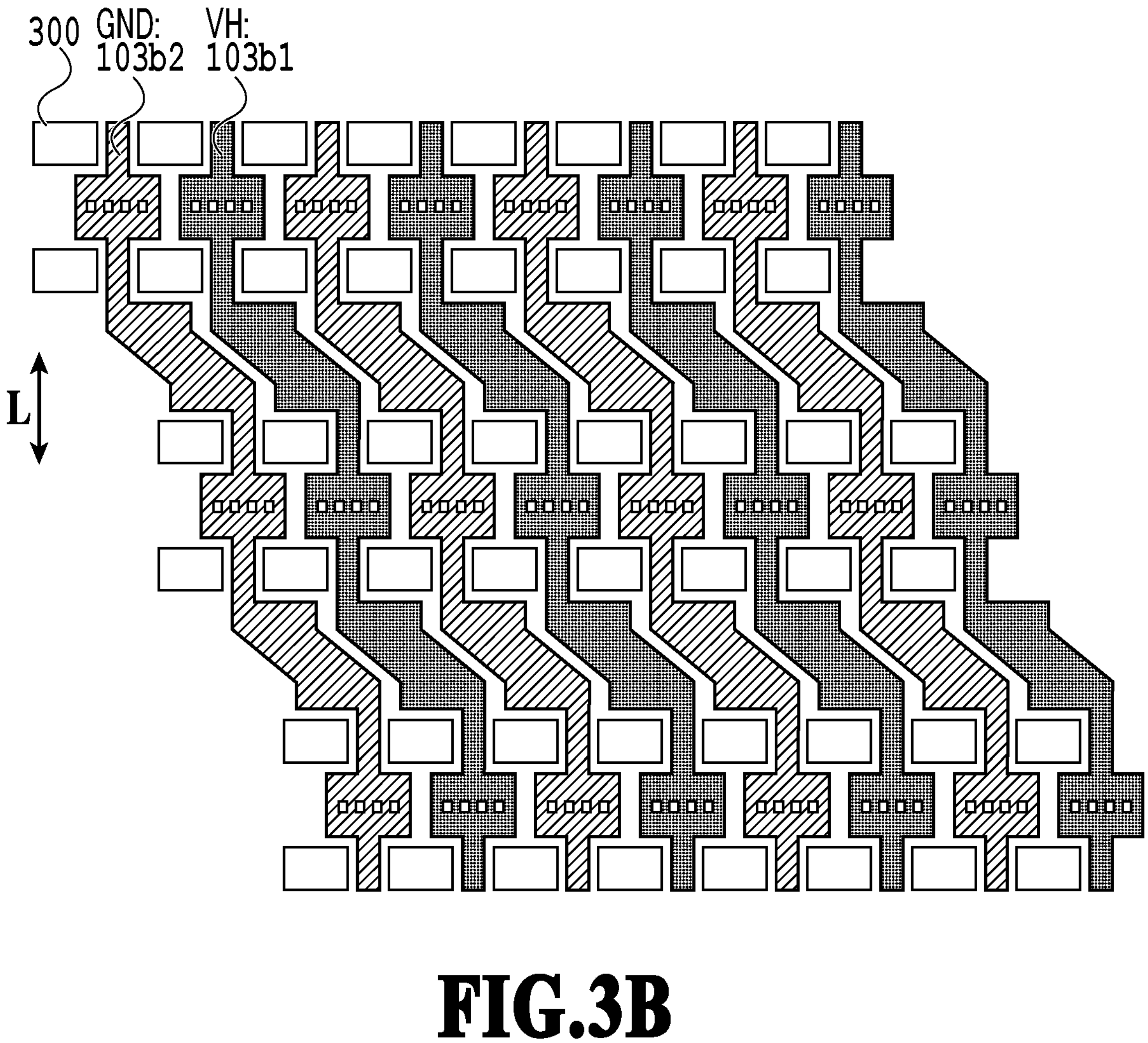
FIG. 3B is an enlarged view of an electrical wiring layer.

FIG. 3A is a plan view showing the element substrate 100 and FIG. 3B is an enlarged view of the electrical wiring layer 103*b* in a portion IIIB in FIG. 3A. The electrical wiring layer 103*b* includes a signal wiring line (not shown) for driving the heating element 101, a logic power supply wiring line (not shown), and a power supply wiring line (electrical wiring group) for supplying the heating element 101 with a current. The power supply wiring line for supplying the heating element 101 with a current includes a VH wiring line 103*b*1, which is a power supply wiring line connected to the entrance side of the current flowing through the heating element 101, and a GNDH wiring line 103*b*2, which is a wiring line connected to the outlet side of the current flowing through the heating element 101. The VH wiring line 103*b*1 and the GNDH wiring line 103*b*2 are arranged alternately in the X direction as shown in FIG. 3B. In the electrical wiring layer 103*b*, a plurality of pairs of the VH wiring line 103*b*1 and GNDH wiring line 103*b*2 run across the entire area of the element substrate 100. In a case where the element substrate 100 has a parallelogram shape as in the present embodiment, the power supply wiring line is connected along the oblique side of the outer shape of the element substrate 100 in a section L in the figure.

Figure 4A:
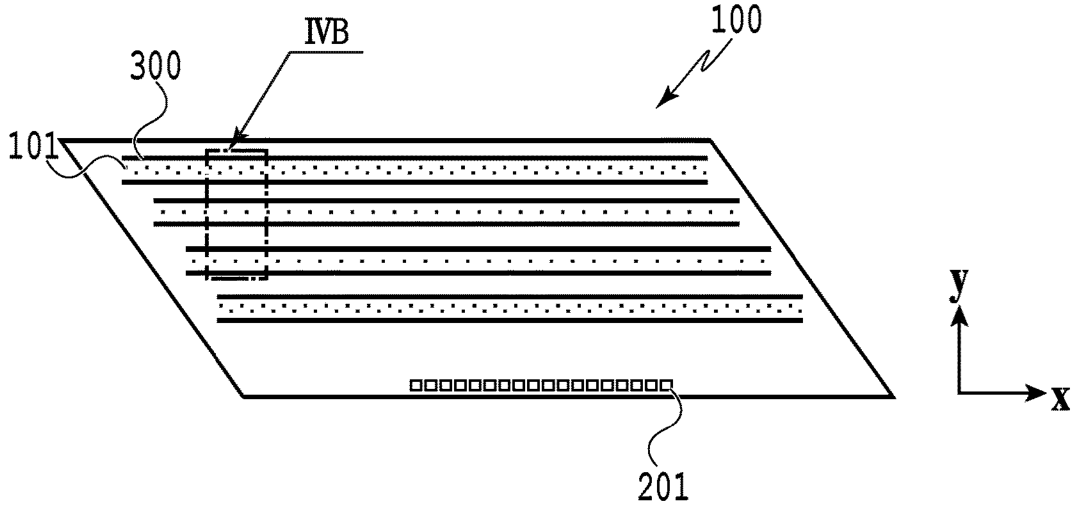
FIG. 4A is a plan view of the element substrate.
Figure 4B:
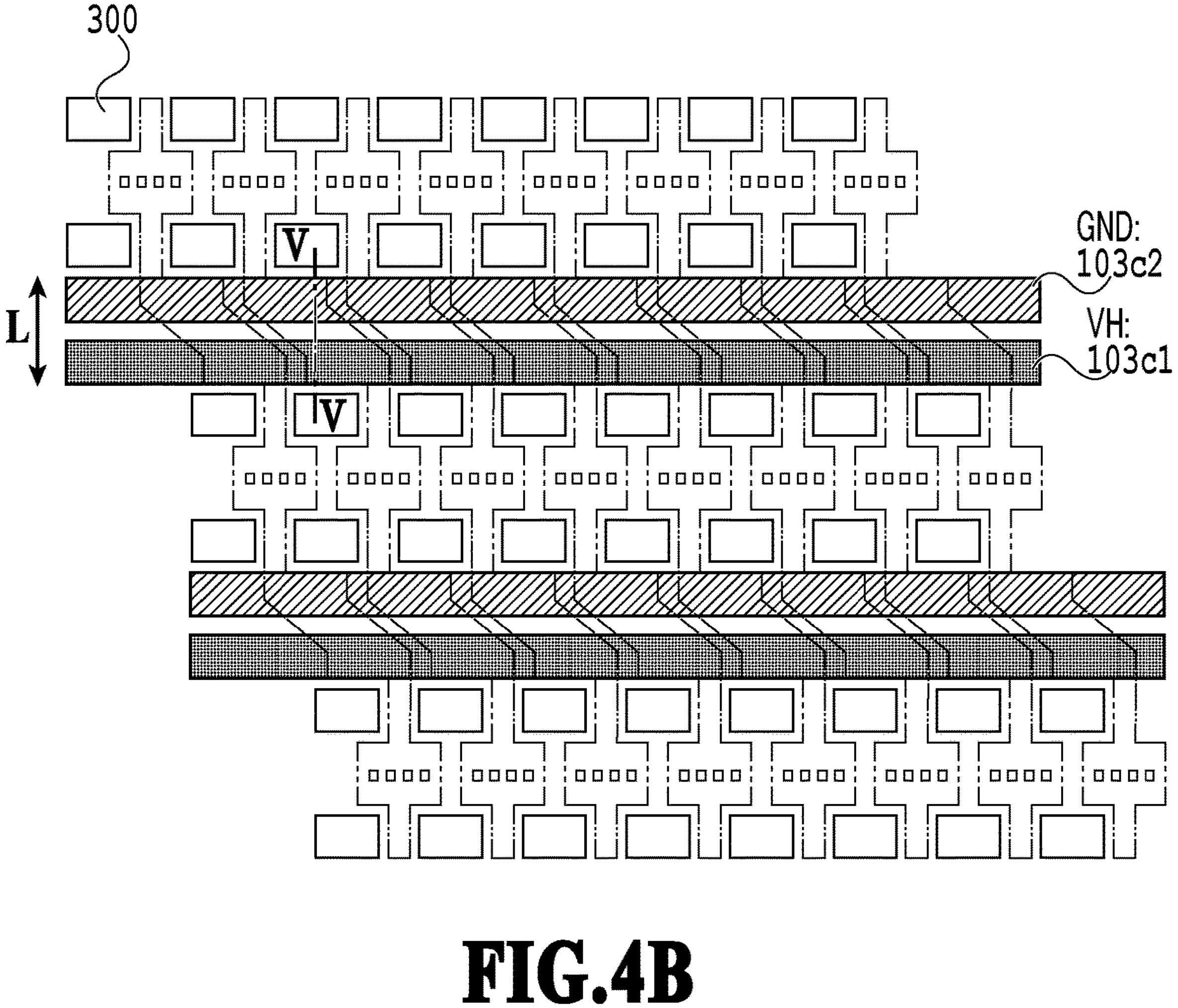
FIG. 4B is an enlarged view of the electrical wiring layer.

FIG. 4A is a plan view showing the element substrate 100 and FIG. 4B is an enlarged view of the electrical wiring layer 103*c* in a portion IVB in FIG. 4A. The electrical wiring layer 103*c* includes a power supply wiring line for supplying the heating element 101 with a current. The power supply wiring line for supplying the heating element 101 with a current includes a VH wiring line 103*c*1, which is a power supply wiring line connected to the entrance side of the current flowing through the heating element 101, and a GNDH wiring line 103*c*2, which is a power supply wiring line connected to the outlet side of the current flowing through the heating element 101. The VH wiring line 103*c*1 and the GNDH wiring line 103*c*2 are arranged alternately in the Y direction as shown in FIG. 4B. In the electrical wiring layer 103*c*, a plurality of pairs of the VH wiring line 103*c*1 and GNDH wiring line 103*c*2 run across the entire area of the element substrate 100.

The VH wiring line 103*c*1 and the GNDH wiring line 103*c*2 are connected to the heating element 101 via the connecting member 102. The VH wiring line 103*b*1 and the VH wiring line 103*c*1 are connected in different layers via a through-hole wiring line at a location where the wiring lines intersect and overlap each other in a case where the element substrate 100 is viewed from the front (when viewed from a viewpoint on a line perpendicular to the electrical wiring layer). Additionally, the GNDH wiring line 103*b*2 and the GNDH wiring line 103*c*2 are also connected in different layers via a through-hole wiring line at a location where the wiring lines intersect and overlap each other in a case where the element substrate 100 is viewed from the front.

Figure 5:
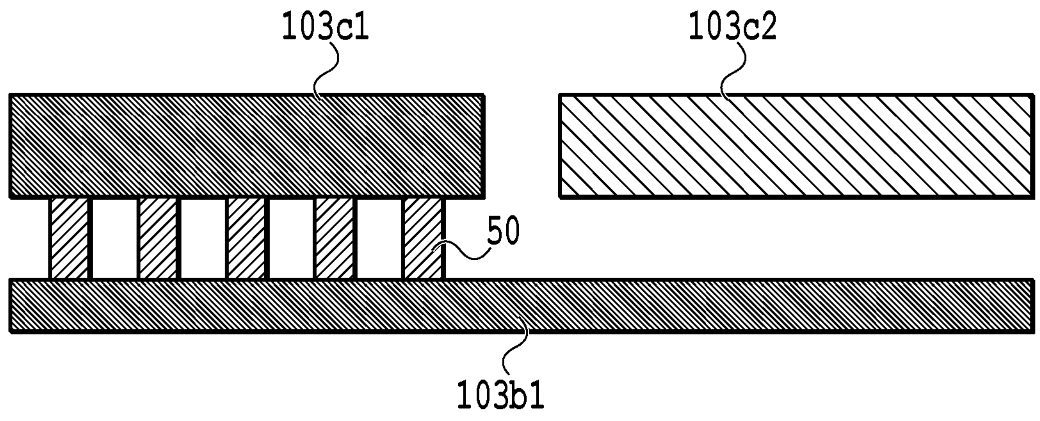
FIG. 5 is a diagram showing through holes between electrical wiring layers.

FIG. 5 is a diagram showing a cross section taken along a line V-V in FIG. 4B. A through hole 50 is formed between the VH wiring line 103*b*1 and the VH wiring line 103*c*1. The VH wiring line 103*b*1 and the VH wiring line 103*c*1 are connected via the through-hole wiring line formed in the through hole. The connection between the VH wiring line 103*b*1 and the VH wiring line 103*c*1 has been described as an example here, but the same applies to the GNDH wiring line 103*b*2 and the GNDH wiring line 103*c*2. In the present embodiment, the electrical wiring layer 103*c* is routed in the X direction and the electrical wiring layer 103*b* is routed in the Y direction.

Here, the thickness (wiring thickness) of the electrical wiring layer 103*c* is 0.8 to 1.2 μm and the thickness of the electrical wiring layer 103*b* is 0.3 to 0.6 μm. Thus, the electrical wiring layer 103*c* has a film thickness larger than that of the electrical wiring layer 103*b*. In a substrate longer in the X direction than in the Y direction, such as the element substrate 100, a voltage drop due to wiring resistance can be reduced by routing a wiring line with a large film thickness and a large cross-sectional area along a longitudinal direction (X direction) than by routing a wiring line with a large film thickness in a lateral direction (Y direction). Accordingly, in the present embodiment, the electrical wiring layer 103*c* routed in the X direction which is the longitudinal direction has a film thickness larger than that of the electrical wiring layer 103*b* routed in the Y direction to reduce the voltage drop.

Figure 6A:
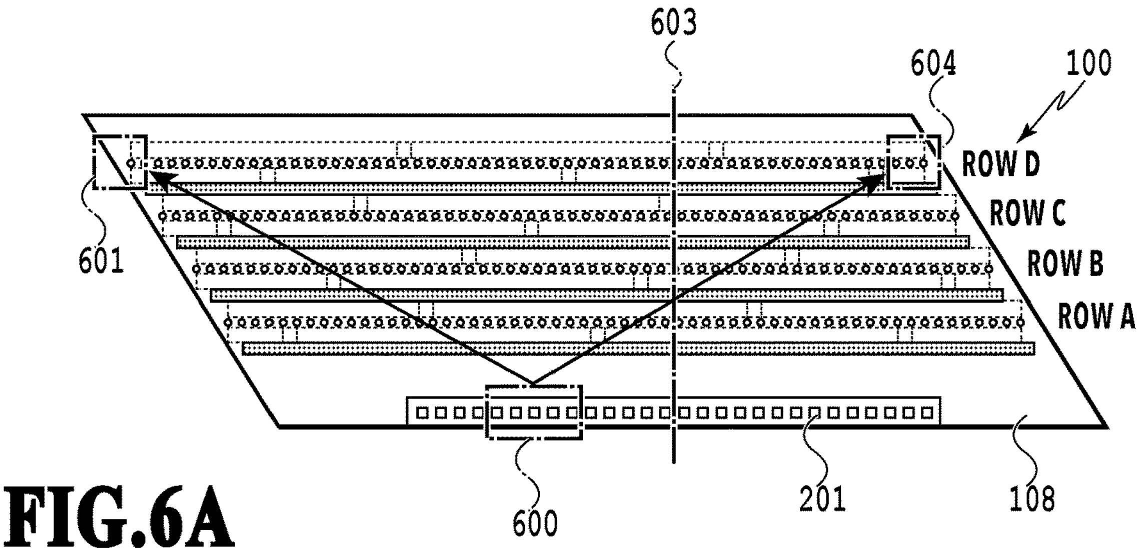
FIG. 6A is a diagram illustrating wiring resistance.
Figure 6B:
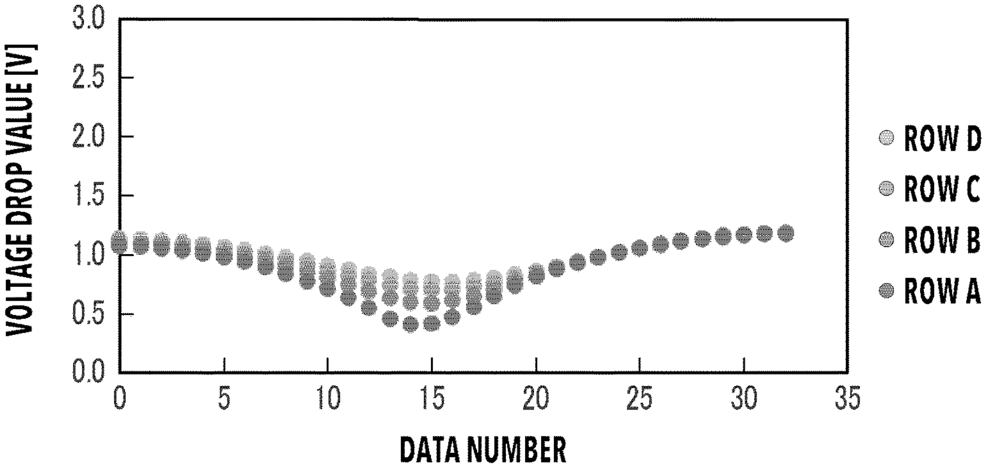
FIG. 6B is a diagram showing a simulation result of a voltage drop.
Figure 6C:
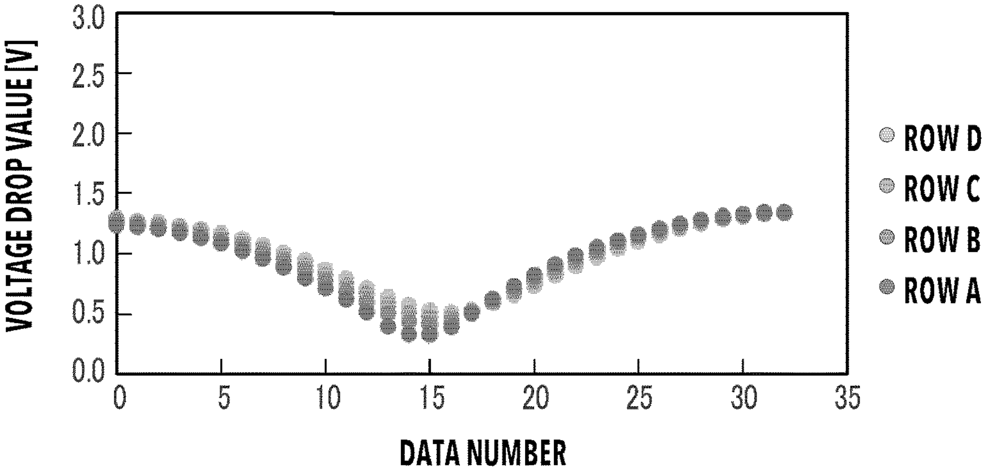
FIG. 6C is a diagram showing a simulation result of a voltage drop.

FIGS. 6A, 6B, and 6C are diagrams illustrating wiring resistance from a heating element driving electrode 600 to the heating element 101 and showing results of simulating a voltage drop caused by the wiring resistance. Here, a voltage drop in the case of driving simultaneously a total of four rows (rows A to D) of 32 heating elements 101 in one row is simulated. FIG. 6B shows a simulation result of routing the electrical wiring layer 103*c* with a large film thickness in the longitudinal direction (X direction) as in the present embodiment and FIG. 6C shows a simulation result of routing the electrical wiring layer 103*c* in the lateral direction (Y direction). It can be seen that in the case of the shape of the element substrate 100 and the arrangement of the heating elements 101 in the present embodiment, a voltage drop value is high in a position 601 (data number 0) and a position 604 (data number 32) where the heating element 101 farthest from the heating element driving electrode 600 is located.

Here, a comparison will be made between the simulation result of routing the electrical wiring layer 103*c* with a large film thickness in the longitudinal direction (X direction) shown in FIG. 6B and the simulation result of routing the electrical wiring layer 103*c* in the lateral direction (Y direction) shown in FIG. 6C. A comparison between values at the position 601 (data number 0) and the position 604 (data number 32) shows that a voltage drop value is smaller in the case of routing the electrical wiring layer 103*c* in the longitudinal direction (X direction) shown in FIG. 6B.

As described above, the VH wiring line and the GNDH wiring line are provided in the same layer. As a result, it is possible to reduce an area where the power supply wiring lines different between the layers face each other (only at locations where the power supply wiring lines intersect each other). This makes it possible to suppress the frequency of interlayer leakages caused by foreign matter generated at the time of generating a wiring line or the like and can achieve a reduction in yield in the manufacturing process. Further, since the VH wiring line and the GNDH wiring line are alternately routed in the same layer, wiring layer constituents can be reduced, so that an increase in cost can be suppressed.

Second Embodiment

A description will be given below of a second embodiment to which the present invention can be applied with reference to the drawings. Since the basic configuration of the present embodiment is the same as that of the first embodiment, characteristic configurations will be described below.

Figure 7A:
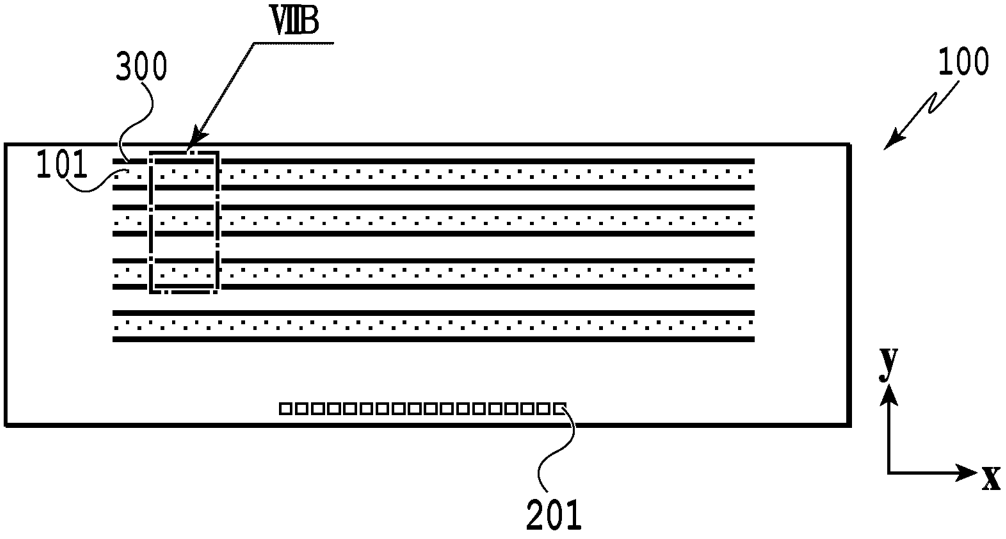
FIG. 7A is a plan view of the element substrate.
Figure 7B:
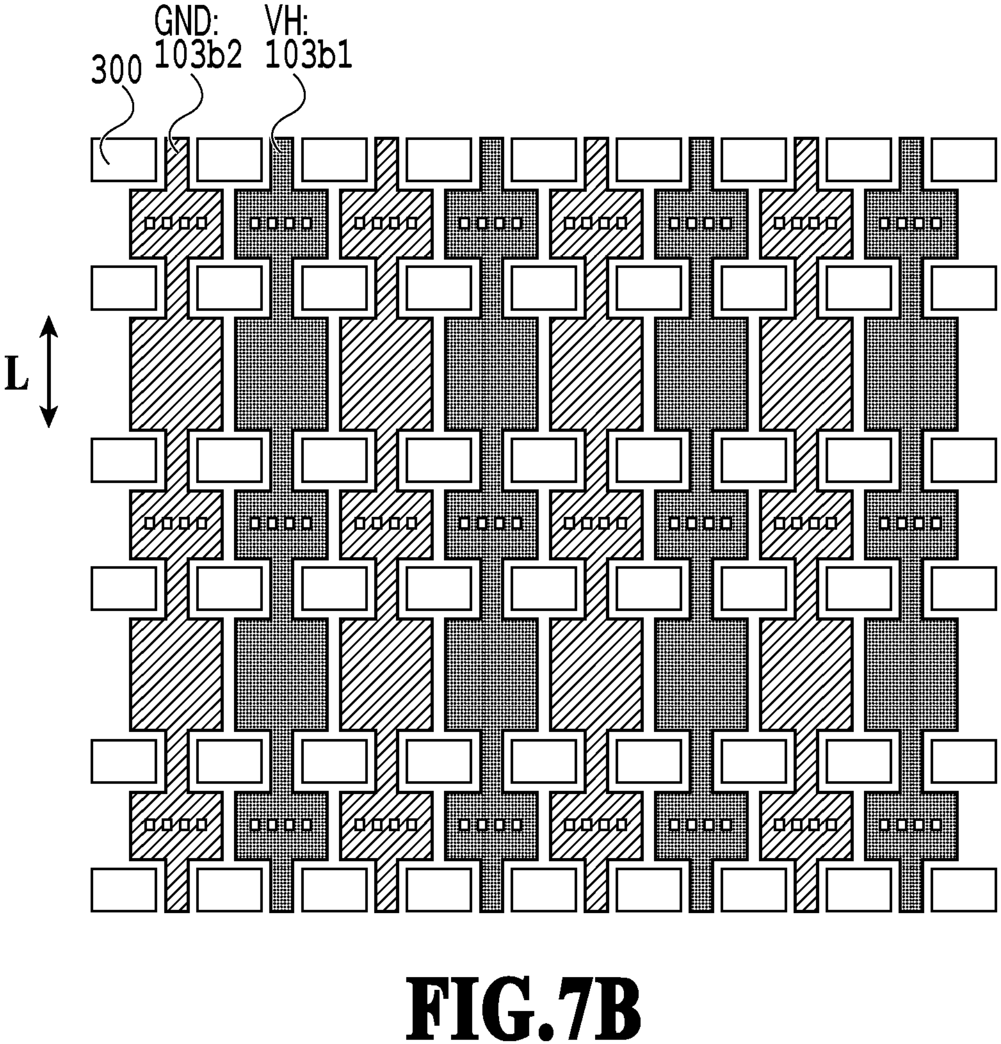
FIG. 7B is an enlarged view of the electrical wiring layer.

FIG. 7A is a plan view showing the element substrate 100 in the present embodiment and FIG. 7B is an enlarged view of the electrical wiring layer 103*b* in a portion VIIB in FIG. 7A. The element substrate 100 in the present embodiment has a rectangular outer shape as shown in FIG. 7A. That is, since the outer shape of the element substrate 100 is a rectangle extending in the X direction and the Y direction, the power supply wiring line is connected along the Y direction in a section L in the figure, and the VH wiring line 103*b*1 and the GNDH wiring line 103*b*2 are arranged alternately in the X direction.

Figure 8A:
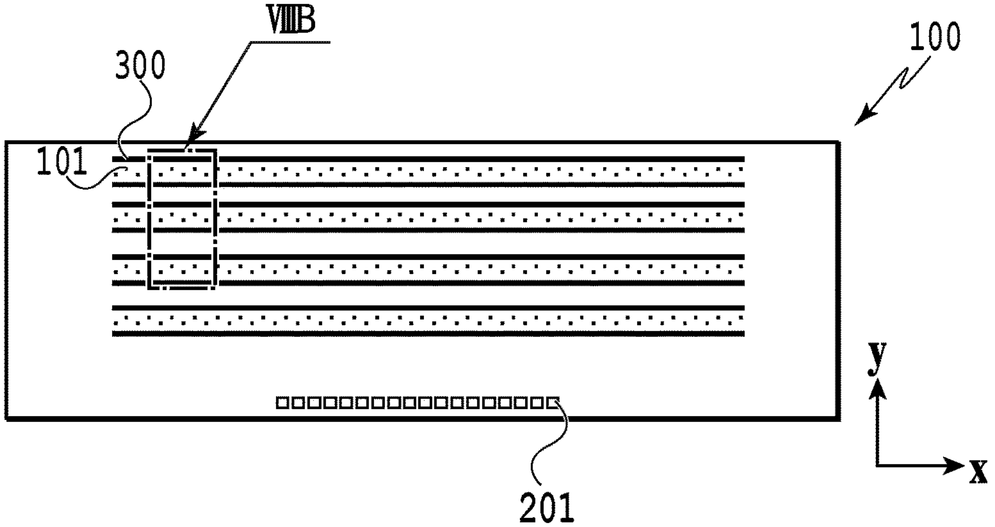
FIG. 8A is a plan view of the element substrate.
Figure 8B:
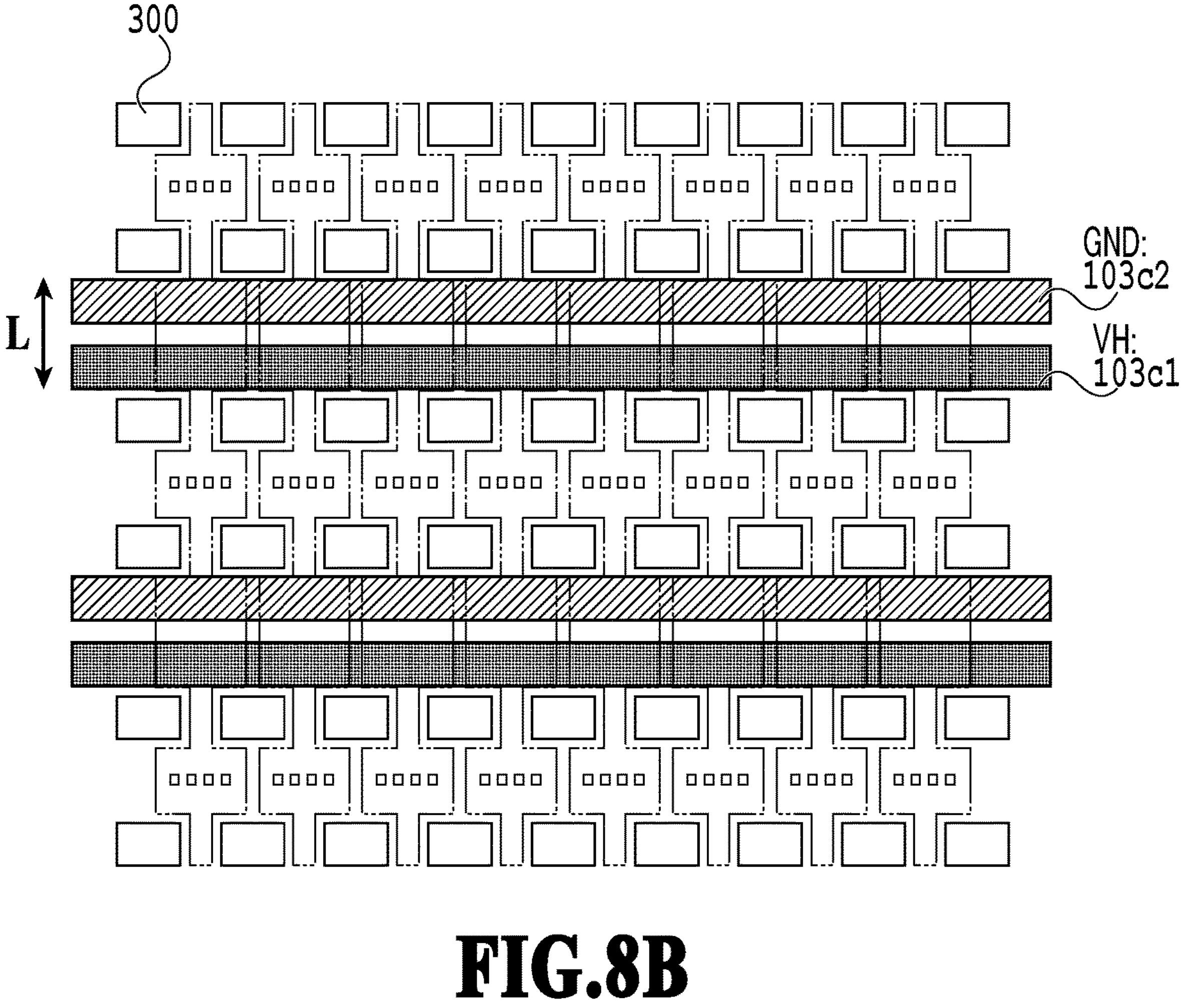
FIG. 8B is an enlarged view of the electrical wiring layer.

FIG. 8A is a plan view showing the element substrate 100 and FIG. 8B is an enlarged view of the electrical wiring layer 103*c* in a portion VIIIB in FIG. 8A. The VH wiring line 103*c*1 and the GNDH wiring line 103*c*2 are alternately arranged in the Y direction as shown in FIG. 8B. The VH wiring line 103*c*1 and the GNDH wiring line 103*c*2 are similarly run across the entire area of the element substrate 100.

A through hole is provided at a location where the power supply VH wiring line 103*b*1 and the VH wiring line 103*c*1 intersect and overlap each other. The power supply VH wiring line 103*b*1 and the VH wiring line 103*c*1 are connected via a through-hole wiring line. The GNDH wiring line 103*b*2 and the GNDH wiring line 103*c*2 are also provided with a through hole at a location where the GNDH wiring line 103*b*2 and the GNDH wiring line 103*c*2 intersect and overlap each other. The GNDH wiring line 103*b*2 and the GNDH wiring line 103*c*2 are connected via a through-hole wiring line.

Third Embodiment

A description will be given below of a third embodiment to which the present invention can be applied with reference to the drawings. Since the basic configuration of the present embodiment is the same as that of the first embodiment, characteristic configurations will be described below.

Figure 9:
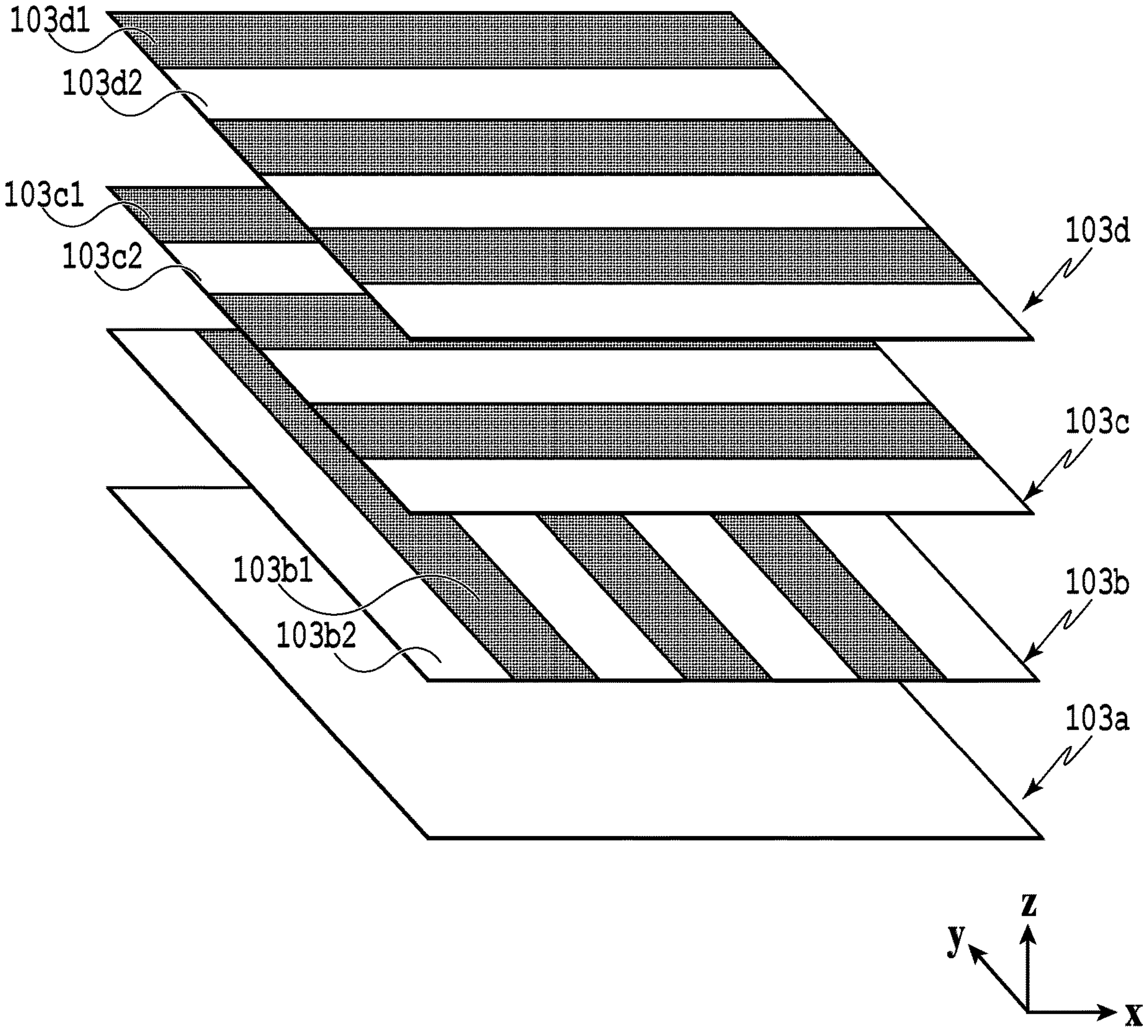
FIG. 9 is a diagram showing a power supply wiring layer.

FIG. 9 is a diagram showing a power supply wiring layer in the present embodiment. The element substrate 100 of the present embodiment includes the electrical wiring layer 103*a* farthest from the heating element 101, the electrical wiring layer 103*b* second farthest from the heating element 101, the electrical wiring layer 103*c* closer to the heating element 101 than the electrical wiring layer 103*b*, and an electrical wiring layer 103*d* closest to the heating element 101. The electrical wiring layer 103*a*, the electrical wiring layer 103*b*, and the electrical wiring layer 103*c* are the same as those in the first and second embodiments. The electrical wiring layer 103*d* is an electrical wiring line having the same shape and the same arrangement (same configuration) as those of the electrical wiring layer 103*c*. That is, the VH wiring line 103*c*1 of the electrical wiring layer 103*c* and the VH wiring line 103*d*1 of the electrical wiring layer 103*d* overlap each other, and the GNDH wiring line 103*c*2 of the electrical wiring layer 103*c* and the GNDH wiring line 103*d*2 of the electrical wiring layer 103*d* overlap each other. As described above, the VH wiring lines overlap each other and the GNDH wiring lines overlap each other, so that it is possible to reduce an area where the VH wiring lines and the GNDH wiring lines face each other and suppress leakage occurring in a case where foreign matter is mixed between the layers.

A through hole is provided between the VH wiring line 103*c*1 of the electrical wiring layer 103*c* and the VH wiring line 103*d*1 of the electrical wiring layer 103*d*. The VH wiring line 103*c*1 and the VH wiring line 103*d*1 are connected via a through-hole wiring line. A through hole is also provided between the GNDH wiring line 103*c*2 of the electrical wiring layer 103*c* and the GNDH wiring line 103*d*2 of the electrical wiring layer 103*d*. The GNDH wiring line 103*c*2 and the GNDH wiring line 103*d*2 are connected via a through-hole wiring line.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-143903 filed Sep. 3, 2021, which is hereby incorporated by reference wherein in its entirety.

What is claimed is:

1. An element substrate comprising:

a plurality of arranged heating elements; and an electrical wiring line configured to supply the heating elements with power, the electrical wiring line being provided in a first electrical wiring layer and a second electrical wiring layer overlapping the first electrical wiring layer, wherein the first electrical wiring layer includes a first wiring line connected to one connecting unit of the heating elements and a second wiring line connected to the other connecting unit of the heating elements, wherein the second electrical wiring layer includes a third wiring line connected to the first wiring line and a fourth wiring line connected to the second wiring line, the first electrical wiring layer including a first wiring group in which at least one pair of the first wiring line and the second wiring line are provided in parallel, the second electrical wiring layer including a second wiring group in which at least one pair of the third wiring line and the fourth wiring line are provided in parallel, wherein a wiring line of the first wiring group and a wiring line of the second wiring group intersect when viewed from a viewpoint of a line orthogonal to the first electrical wiring layer, and wherein the first wiring group and the second wiring group are different in wiring thickness.

2. The element substrate according to claim 1, wherein in the first electrical wiring layer, a plurality of pairs of the first wiring lines and the second wiring lines are provided, the first wiring lines and the second wiring lines being arranged alternately, and in the second electrical wiring layer, a plurality of pairs of the third wiring lines and the fourth wiring lines are provided, the third wiring lines and the fourth wiring lines being arranged alternately.

3. The element substrate according to claim 1, wherein an outer shape is a parallelogram, and a wiring line of the first wiring group and a wiring line of the second wiring group are provided along respective edges of the outer shape.

4. The element substrate according to claim 1, wherein an outer shape is a rectangle, and a wiring line of the first wiring group and a wiring line of the second wiring group are provided along respective edges of the outer shape.

5. The element substrate according to claim 1, wherein a wiring line of the first wiring group and a wiring line of the second wiring group are provided across an entire area of the element substrate, and one wiring group extending in a longitudinal direction of the element substrate out of the first wiring group and the second wiring group has a wiring thickness larger than a wiring thickness of the other wiring group extending in a lateral direction.

6. The element substrate according to claim 1, wherein a through hole is provided between the first electrical wiring layer and the second electrical wiring layer, a wiring line of the first wiring group and a wiring line of the second wiring group being connected via a through-hole wiring line passing through the through hole.

7. The element substrate according to claim 1, wherein the electrical wiring line is a metal and is made of any one of Al, Cu, Ag, Au, Pt, W, Ni, and Co or an alloy including any one of Al, Cu, Ag, Au, Pt, W, Ni, and Co.

8. The element substrate according to claim 1, further comprising:

a plurality of supply ports capable of supplying the heating elements with a liquid; and a plurality of collection ports capable of collecting a liquid from the heating elements.

9. The element substrate according to claim 1, further comprising a plurality of electrodes configured to transfer power from outside to the heating elements.

10. The element substrate according to claim 1, further comprising:

a third electrical wiring layer including a fifth wiring line connected to the first wiring line and a sixth wiring line connected to the second wiring line, wherein the third electrical wiring layer includes a third wiring group in which at least one pair of the fifth wiring line and the sixth wiring line are provided in parallel, and wherein a wiring arrangement in the third wiring group is identical to a wiring arrangement in the first wiring group.

11. A print head comprising the element substrate according to claim 1.

* * * * *